United States Patent
Sumino

(10) Patent No.: US 6,950,676 B2
(45) Date of Patent: Sep. 27, 2005

(54) PORTABLE TELEPHONE APPARATUS FOR ACHIEVING ROAMING WITH A LOW AMOUNT OF CODE BETWEEN TWO SYSTEMS

(75) Inventor: Morihiko Sumino, Kobe (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 571 days.

(21) Appl. No.: 09/816,235

(22) Filed: Mar. 26, 2001

(65) Prior Publication Data

US 2001/0027118 A1 Oct. 4, 2001

(30) Foreign Application Priority Data

Mar. 28, 2000 (JP) ........................................ 2000-089523

(51) Int. Cl.[7] .............................. H04Q 7/20; H04Q 7/32; H04Q 7/36
(52) U.S. Cl. ................................ 455/552.1; 455/553.1; 455/550.1; 455/422.1; 455/426.1; 455/412.1; 455/435.2; 455/434
(58) Field of Search .................................. 455/434, 515, 455/551, 553.1, 556.1, 556.2, 466, 414.1, 426.2, 500, 517, 552.1, 550.1, 422.1, 426.1, 403, 435.1, 435.2, 435.3, 432.1, 432.2, 432.3, 414.2, 412.1, 412.2, 421

(56) References Cited

U.S. PATENT DOCUMENTS

| | | | | |
|---|---|---|---|---|
| 5,946,634 A | * | 8/1999 | Korpela | 455/552.1 |
| 6,223,030 B1 | * | 4/2001 | Van Den Heuvel et al. | 455/435.2 |
| 6,594,505 B1 | * | 7/2003 | Ishii | 455/552.1 |
| 6,731,957 B1 | * | 5/2004 | Shamoto et al. | 455/574 |
| 2003/0017842 A1 | * | 1/2003 | Moles et al. | 455/552 |

FOREIGN PATENT DOCUMENTS

| JP | 09-163450 | 6/1997 |
|---|---|---|
| JP | 11-346383 | 12/1999 |

OTHER PUBLICATIONS

"Mobile Station–Base Station Compatibility Standard for Dual–Mode Wideband Spread Spectrum Cellular System," TIA/EIA Interim Standard, TIA/EIA/IS–95–A, May 1995, Telecommunications Industry Association.

* cited by examiner

Primary Examiner—Keith Ferguson
(74) Attorney, Agent, or Firm—Arent Fox PLLC

(57) ABSTRACT

A portable telephone apparatus that achieves international roaming inexpensively by performing roaming between mobile telephone systems that use different communication protocols. In detail, if the present apparatus, in an initialization state, receives a sync channel message generated from a base station, the portable telephone apparatus reads a P_REV message which shows the communication protocol used in the mobile phone system. When the communication protocol is T53, the portable telephone apparatus performs a plurality of procedures from an idle state through to a traffic channel state in a standard manner, but when the communication protocol is IS-95, the potable telephone apparatus controls wireless communication by replacing one procedure of the plurality of procedures performed from the idle state through to the traffic channel state with another procedure.

7 Claims, 8 Drawing Sheets

STATE TRANSITION MAP

FIG. 3

SYNC CHANNEL MESSAGE

| Field | Length(bits) |
|---|---|
| MSG_TYPE("00000001") | 8 |
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| RESERVED | 3 |

FIG.4

Paging Channel Message

| Message Name | Message Type (binary) |
|---|---|
| System Parameters Message | 00000001 |
| Access Parameters Message | 00000010 |
| ① Neighbor List Message | 00000011 |
| CDMA Channel List Message | 00000100 |
| Slotted Page Message | 00000101 |
| Page Message | 00000110 |
| Order Message | 00000111 |
| ② Channel Assignment Message | 00001000 |
| Data Burst Message | 00001001 |
| Authentication Channel Message | 00001010 |
| SSD Update Message | 00001011 |
| Feature Notification Message | 00001100 |
| Extended System Parameters Message | 00001101 |
| Reserved | 00001110 |
| Reserved | 00001111 |
| Service Redirection Message | 00010000 |
| General Page Message | 00010001 |
| Global Service Redirection Message | 00010010 |
| Null Message | |

FIG.5A

Forward Traffic Channel Message

| Message Name | Message Type (binary) |
|---|---|
| Order Message | 00000001 |
| Authentication Channel Message | 00000010 |
| Alert With Information Message | 00000011 |
| Data Burst Message | 00000100 |
| Handoff Direction Message | 00000101 |
| Analog Handoff Direction Message | 00000110 |
| In-Traffic System Parameters Message | 00000111 |
| Neighbor List Update Message | 00001000 |
| Send Burst DTMF Message | 00001001 |
| Power Control Parameters Message | 00001010 |
| Retrieve Parameters Message | 00001011 |
| Set Parameters Message | 00001100 |
| SSD Update Message | 00001101 |
| Flash With Information Message | 00001110 |
| Mobile Station Registered Message | 00001111 |
| Reserve | 00010000 |
| Extended Handoff Direction Message | 00010001 |

(3) Alert With Information Message
(4) Handoff Direction Message

FIG.5B

Order Message

| Registration Rejected Order |
| Service Option Control Order |
| Local Control Order |
| Service Option Request Order |

(5) Service Option Request Order

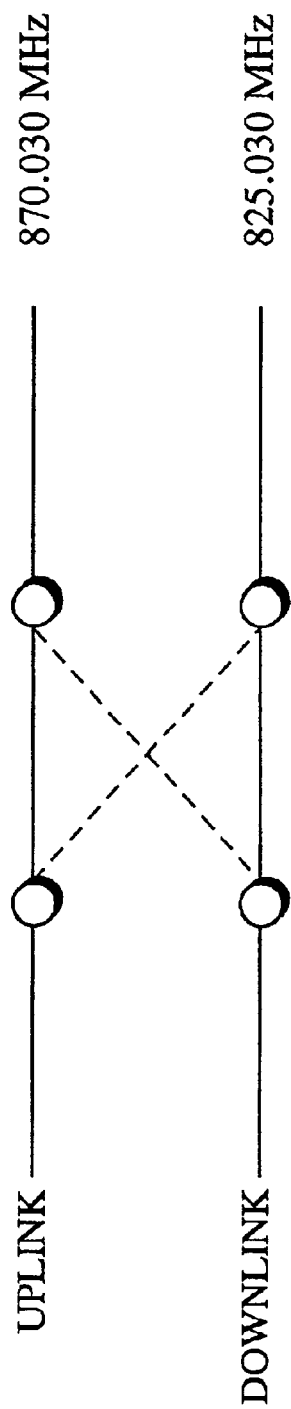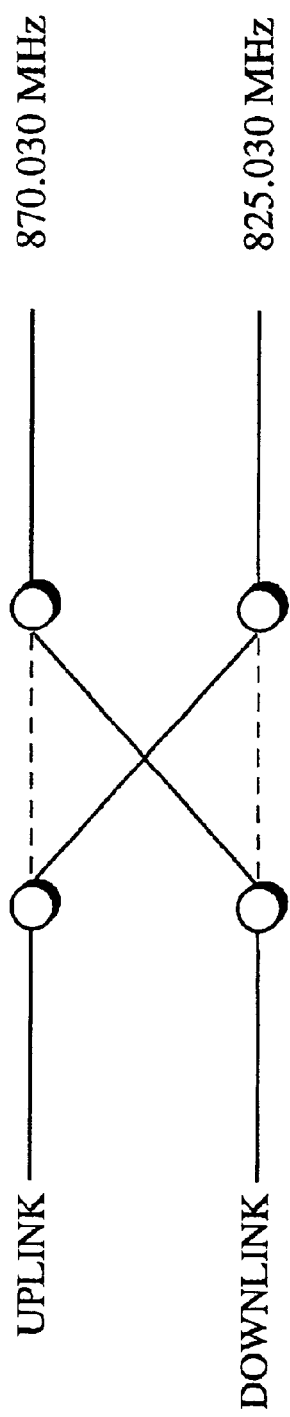
FIG.6A
FIG.6B

PORTABLE TELEPHONE APPARATUS FOR ACHIEVING ROAMING WITH A LOW AMOUNT OF CODE BETWEEN TWO SYSTEMS

BACKGROUND OF THE INVENTION

1. Field of the Invention

The present invention relates to a portable telephone apparatus for performing wireless communication through a base station in a first portable telephone system that uses a predetermined communication protocol, and to the improvement of roaming between the first portable telephone system and a second portable telephone system that uses a different communication protocol.

2. Description of the Background Art

In recent years mobile phone infrastructure has been developed in industrialized nations such as Japan, the US and European countries, as well as various other countries around the world.

Time Division Multiple Access (TDMA), Frequency Division Multiple Access (FDMA), and Code Division Multiple Access (CDMA) are examples of systems generally used in wireless communication. CDMA is thought to have particular potential as it has superior multipath phasing measures and allows better communication in built up areas.

The CDMA mobile phone system was developed by the US company Qualcomm. After being adopted as US standard IS-95 in 1993, the system came into mainstream use and is now employed in numerous countries including Hong Kong (since September 1995) and South Korea (since January 1996). Meanwhile, the IS-95 standard was revised to IS-95A and then to IS-95B. Japan employs a mobile phone system ARIB STD-T53 (commonly known as T53) that conforms with IS-95A.

As mobile phone system infrastructure is improved in various countries, the appearance of portable telephones that are capable of international roaming is anticipated.

A portable telephone apparatus capable of international roaming can be used in a first country, and, when taken from the first country to a second country, can also be operated in the second country. Here, it is possible that a portable telephone apparatus compatible with the US IS-95 system could also be used in Hong Kong and South Korea, and thus so-called international roaming could be performed between the US and Hong Kong and the US and South Korea. This is because Hong Kong and South Korea use the same IS-95 system as the US, meaning that providing a portable telephone apparatus performs procedures compatible with IS-95, communication can take place with the mobile phone system in any of these countries.

However, when a portable telephone that can be used in the US IS-95 protocol mobile phone system is taken to Japan, which uses the ARIB STD-T53 communication protocol mobile phone system, the portable telephone apparatus performs procedures in compliance with IS-95, but the system performs procedures in compliance with T53. Here the procedures performed by the portable telephone do not match those performed by the system. As a result the portable telephone apparatus taken to Japan cannot perform communication, making international roaming between Japan and the US impossible.

In a portable telephone apparatus, the procedures performed according to the communication protocol are implemented in the program code. Therefore if program code for procedures in both IS-95 and T53 is packaged in the apparatus in advance, international roaming between countries that use different protocols, such as between Japan and the United States, should be possible. However, if program code for procedures in both IS-95 and T53 is packaged in a portable telephone apparatus, the program code size will be double that of when program code for only one protocol is packaged. If the code size is doubled it is necessary to double the size of the memory that stores the code, resulting in high manufacturing costs for such a portable telephone apparatus.

SUMMARY OF THE INVENTION

The object of the present invention is to provide, at low cost, a portable telephone apparatus that implements roaming between portable telephone systems that use different communication protocols.

The portable telephone apparatus of the present invention is a portable telephone apparatus for roaming between a first portable telephone system and a second portable telephone system. The portable telephone apparatus includes a reception unit for receiving a message transmitted from a base station in one of the two systems, a judging unit for judging whether a received message has a common format in the two systems or a different format in the two systems, a first processing unit for processing the received message by performing a procedure common to the two systems when the message has the common format, and a second processing unit for processing the received message by performing procedures unique to each of the two systems when the message has the different format.

With the above-described construction, program code corresponding to common format messages can be shared. The only program code that need be supplied for each individual communication protocol is that corresponding to messages having different formats in different communication systems. As a result, in the portable telephone apparatus of the present invention the necessary amount of program code in the package is "common procedures+different procedures", meaning that the more messages that the two communication protocols have in common, the greater the reduction in the amount of overall program code. In this way, storage capacity is reduced, improving cost performance.

In particular, when one of a first communication protocol and a second communication protocol is based on the other, the two protocols have numerous messages in common, allowing for program code to be reduced. In this way, roaming, for example between the United States and Japan, can be implemented with a low amount of program code.

Furthermore, the portable telephone apparatus may further include a protocol revision receiving unit for receiving, from the base station, a protocol revision message showing a type of communication protocol used in one of the two systems. The reception unit may receive a succeeding message which succeeds the protocol revision message, from the base station. The second processing unit may process the succeeding message by performing a procedure unique to the first system when the communication protocol in the first system is shown in the protocol revision message, and process the following message by performing a procedure unique to the second system when the communication protocol in the second system is shown in the protocol revision message.

With the above-described construction, the switching of procedures is performed based on the type of communication protocol shown in the protocol revision message. Therefore it is possible to execute the necessary procedures for international roaming without operations from the user, enabling the user to take the portable telephone apparatus to a first country or a second country without having to perform troublesome operations.

Here, a base station in the first system may transmit the protocol revision message on a first frequency, and a base station in the second system may transmit the protocol revision message on a second frequency. The protocol receiving unit may receive either of the two protocol revision messages by scanning the first frequency and the second frequency.

A portable telephone apparatus according to this construction can perform acquisition of a base station even if the upstream channel and downstream channel allocated frequencies are opposite, as with IS-95 communication protocol and T53 communication protocol.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows the data format of the sync channel message;

FIG. 4 shows the data format of the paging channel message;

FIG. 5A shows the data format of the forward traffic channel message;

FIG. 5B shows an example of the order message;

FIGS. 6A and 6B show examples of the allocated frequencies of the upstream channel and the downstream channel;

DESCRIPTION OF THE PREFERRED EMBODIMENT(S)

Figure 1:
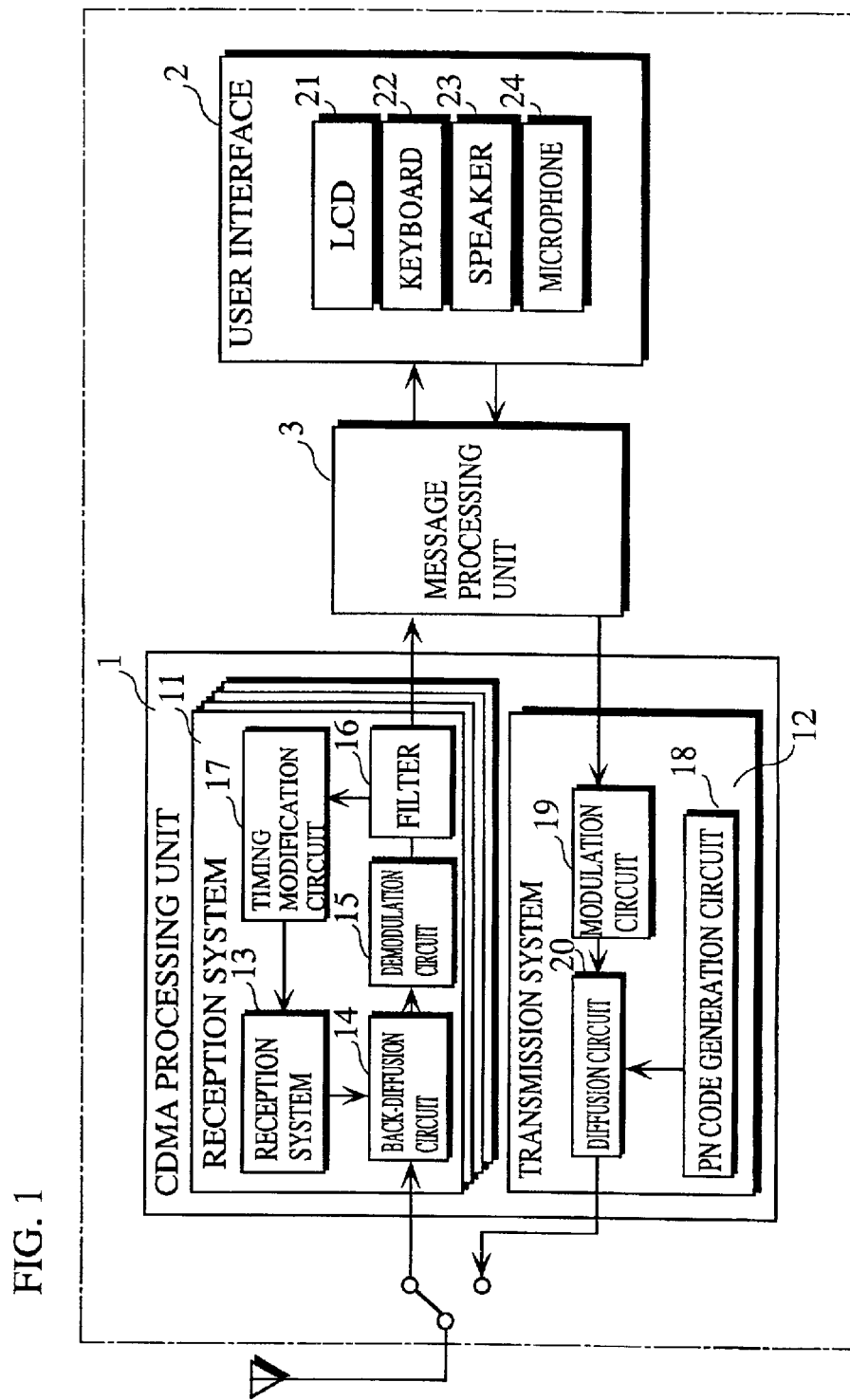
FIG. 1 is a view of the inner construction of a portable telephone apparatus in an embodiment of the present invention.

An embodiment of a portable telephone apparatus will be explained with reference to the drawings. FIG. 1 shows the inner construction of an embodiment of the portable telephone apparatus of the present invention. The portable telephone apparatus includes a CDMA processing unit 1, a user interface 2, and a message processing unit 3.

The CDMA processing unit 1, which transmits and receives messages to and from a base station, includes 4 to 5 CDMA reception systems 11, and one transmission system 12.

Each CDMA reception system 11 includes a PN (pseudonoise) code generation circuit 13, a back-diffusion circuit 14, a demodulation circuit 15, a filter 16, and a timing modification circuit 17. The PN code generation circuit 13 generates PN code sequences. The back-diffusion circuit 14 performs back-diffusion by hybridizing reception signals induced by an antenna with a generated PN code sequence. The demodulation circuit 15 performs linear demodulation on back-diffused reception signals to obtain messages generated by a base station. The filter 16 passes only decoded signals with specific waveband components. The timing modification circuit 17 performs synchronous acquisition of the base station by instructing the PN code generation circuit 13 of modifications in the timing of PN code sequence generation, in accordance with the amplitude of signals output from the filter 16. The 4 to 5 reception systems 11, collectively called a "finger", receive radio waves and multipath from a plurality of base stations.

The CDMA transmission system 12 includes a PN code generation circuit 18, a modulation circuit 19, and a diffusion circuit 20. The PN code generation circuit 18 generates PN code sequences. The modulation circuit 19 performs linear modulation of output signals (messages) to be outputted to a base station. The diffusion circuit 20 performs diffusion on output signals that have been subject to linear modulation by hybridizing each signal with a PN code sequence, and then transmitting the hybridized signal via the antenna to a base station.

The user interface 2 includes a liquid crystal display (LCD) 21 for displaying character strings and symbols, a keyboard 22 for receiving operations from the user, a speaker 23, and a microphone 24.

Figure 2:
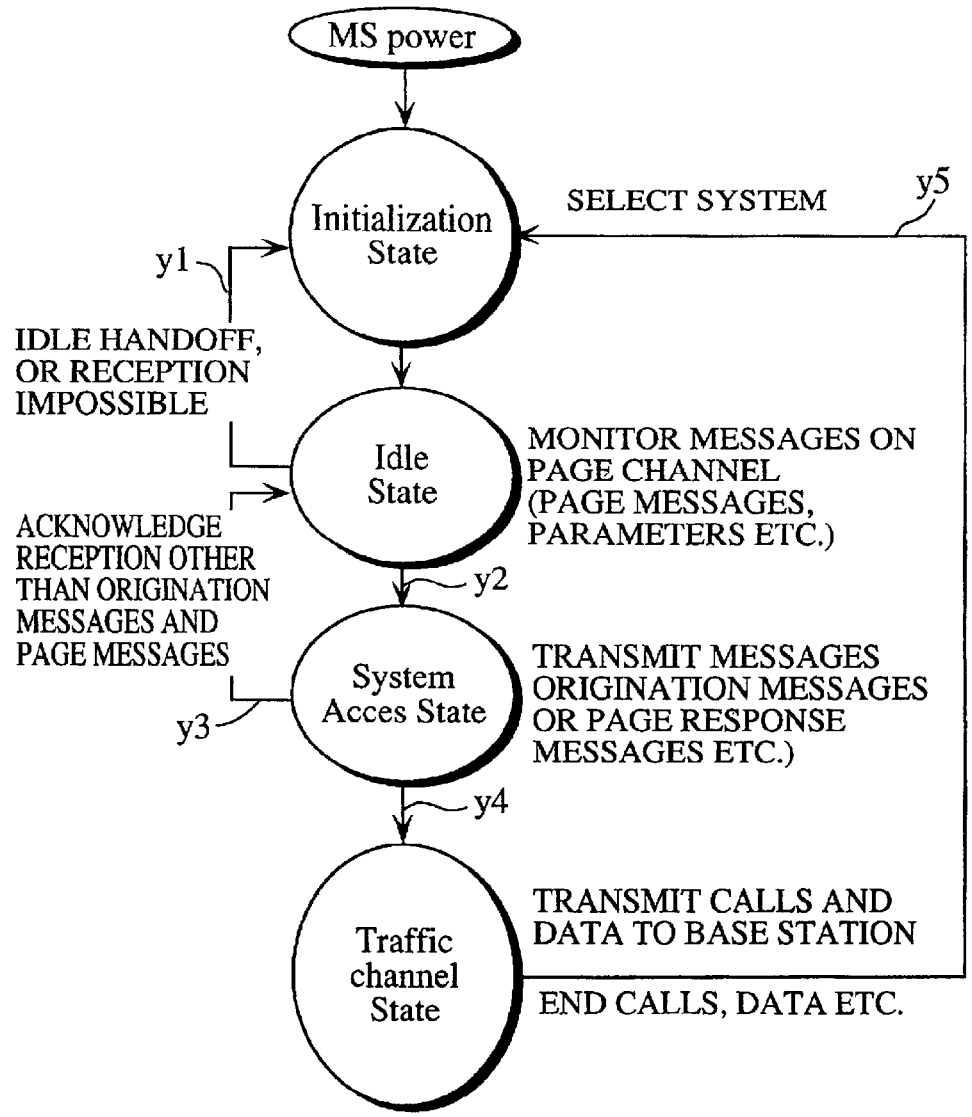
FIG. 2 shows an outline of state transition in a portable telephone apparatus.

The message processing unit 3 performs state transition as shown in FIG. 2 from an initialization (hereafter "init") state through to a traffic channel state and performs overall control of messages transmitted and received via the CDMA processing unit 1, according to messages transmitted from a base station and operations of the user interface 2 performed by the user.

FIG. 2 shows an outline of state transition in a portable telephone apparatus.

In the init state the message processing unit 3 finds as many base stations as possible that have a radiowave that can reach the portable telephone apparatus, and selects one with a reception signal electric field strength that is of at least a predetermined level. When a base station has been selected, the portable telephone apparatus uses a sync channel message sent from the base station to perform synchronous acquisition, and shifts to an idle state.

In the idle state, the message processing unit 3 is on standby. That is to say, the message processing unit 3 monitors messages on the paging channel, and waits to receive page messages and various parameters. In this state, the message processing unit 3 returns to the init state (FIG. 2, y1) if idle handoff is performed or if reception of messages on the paging channel is impossible. If an on-hook operation is performed on the portable telephone apparatus, or, if the portable telephone apparatus receives a page message, the message processing unit 3 proceeds to a system access state (FIG. 2, y2).

In the system access state the message processing unit 3 transmits origination messages to the base station on the paging channel when an on-hook operation is performed or a telephone number is pressed on the portable telephone apparatus. If the portable telephone apparatus receives a page message, it transmits a page response message on the paging channel. When acknowledgement other than that of either a page message or an origination message is received, the message processing unit 3 goes back to the idle state (FIG. 2, y3). After sending an origination message or a page response message, the message processing unit 3 performs position registration with the base station, and when call connection is complete, proceeds to the traffic channel state (FIG. 2, y4).

In the traffic channel state, after call connection has been performed, the message processing unit 3 performs calls and data communication using the traffic channel. In addition, if the position of the portable telephone apparatus changes during a call or data communication the message processing unit 3 performs the accompanying hand off. If the user performs operations such as off-hook operations, the message processing unit 3 ends the call or the data communication and proceeds to the init state (FIG. 2, y5).

Next, messages received and transmitted between the base station and the portable telephone apparatus in each of the states above will be explained, together with some similarities and differences between IS-95 and T53.

A similarity in the init state is that both systems use the sync channel message shown in FIG. 3 to perform synchronous acquisition with the base station. An important part of the sync channel message shown in FIG. 3 is the P_REV (protocol revision) which shows whether the communication protocol used in the mobile phone system is IS-95 or T53. In other words, if the portable telephone apparatus receives the sync channel message and refers to the P_REV field, it is able to recognize whether the communication protocol used in the mobile phone system is IS-95 or T53.

A difference between IS-95 and T53 in the init state is that the allocated frequency bands of the upstream and downstream channels for the sync channel are opposite ("upstream" refers to the direction from the portable telephone apparatus to the base station, "downstream" refers to the direction from the base station to the portable telephone apparatus). In T53 a frequency of 825.030 MHz is allocated to the upstream channel, and a frequency of 870.030 MHz is allocated to the downstream channel, while in IS-95 a frequency of 870.030 MHz is allocated to the upstream channel and a frequency of 825.030 MHz is allocated to the downstream channel. Hence, in the T53 mobile phone system the above sync channel message is transmitted at 870.030 Mhz, whereas in the IS-95 mobile phone system the above sync channel message is transmitted at 825.030 MHz.

Next, similarities and differences in the idle state and the system access state will be explained. In both T53 and IS-95 the paging channel message shown in FIG. 4 is used to perform cooperative procedures with a base station in the idle state and the system access state. However, the formats of (1) and (2) in the paging channel message shown in FIG. 4 differ between T53 and IS-95.

The neighbor list (FIG. 4 (1)) is a message for notifying the portable telephone apparatus of a list of information about base stations around the portable telephone apparatus. The message processing unit 3 refers to this neighbor list, an active list, and a remain list while searching for the base station that can maintain the best communication state. The active list is a list of the base station actually acquired. The remain list is a list of base stations that have been acquired previously.

In T53 the neighbor list message includes frequency information, making acquisition of base stations with different frequencies possible. On the contrary, in IS-95 the neighbor list message does not include frequency information, making acquisition of base stations with different frequencies impossible.

The channel assignment message (FIG. 4 (2)) is for performing allocation procedures on the paging channel and the traffic channel.

This completes the explanation of the idle state and the system access state. Next the traffic channel state will be explained.

In the traffic channel state, use of the forward traffic channel message shown in FIG. 5A is common to both T53 and IS-95, however the structure of the fields in the traffic channel numbered (3) and (4) in FIG. 5 differ between T53 and IS-95.

The alert with information (FIG. 5 (3)) is a message for performing tone (dial-tone, engaged signal etc.) control procedures.

The handoff direction message (FIG. 5 (4)) is a message for performing handoff control procedures. ("Handoff" refers to the process of switching from one acquired base station to another when a user moves.)

In addition, the service option request order field format included in the order message differs between T53 and IS-95. FIG. 5B shows the order message included in the paging channel message and the forward traffic channel message. The service option request order (FIG. 5B (5)) is for deciding various communication modes such as voice communication, data communication, and short message communication; a command that performs so-called service options control procedures.

Based on the similarities and differences outlined above, the following type of procedures allows a portable telephone apparatus to perform communication in mobile phone systems using both T53 and IS-95. Namely, the portable telephone apparatus receives a sync channel message transmitted at either 870.030 MHz or 825.030 MHz, and by referring to the P_REV message in the sync channel message is able to recognize whether the communication protocol used by the mobile phone system and base station in the area in which the portable telephone apparatus is located is T53 or IS-95. Subsequently, when the message processing unit 3 proceeds from the idle state through to the traffic channel state, procedures unique to each of T53 and IS-95 are performed only when messages (1) to (5) are received and transmitted.

As the allocated frequencies of the upstream and downstream channels in IS-95 and T53 are opposite, the message processing unit 3 in the present embodiment swaps the upstream and downstream channel frequencies by performing a connection swap, such as that shown in FIG. 6, in the software. If the connection swap is performed as in FIG. 6A, a frequency of 870.030 MHz is allocated to the upstream channel and a frequency of 825.030 MHz is allocated to the downstream channel. If the connection swap is performed as in FIG. 6B, a frequency of 825.030 MHz is allocated to the upstream channel and a frequency of 870.030 MHz is allocated to the downstream channel. For example, the message processing unit 3 allocates the frequencies as shown in FIG. 6A and attempts acquisition of a base station. If acquisition is successful, the message processing unit 3 proceeds from the init state to the idle state. However, if acquisition of a base station is impossible with the frequencies allocated as in FIG. 6A, the message processing unit 3 allocates the frequencies as in FIG. 6B and attempts again to acquire a base station.

Figure 7:
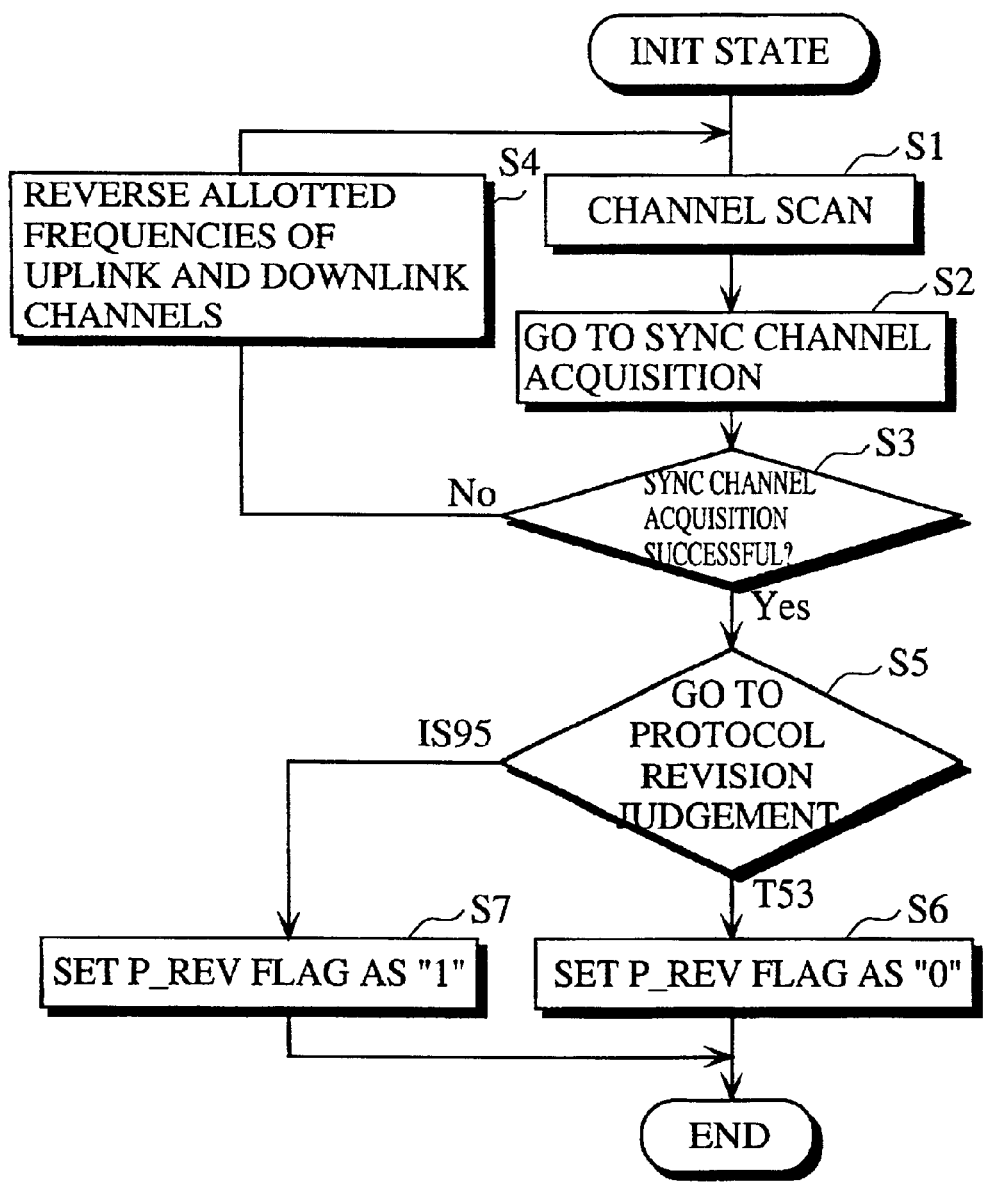
FIG. 7 is a flowchart showing the procedures of the message processing unit 3 in the initialization state.
Figure 8:
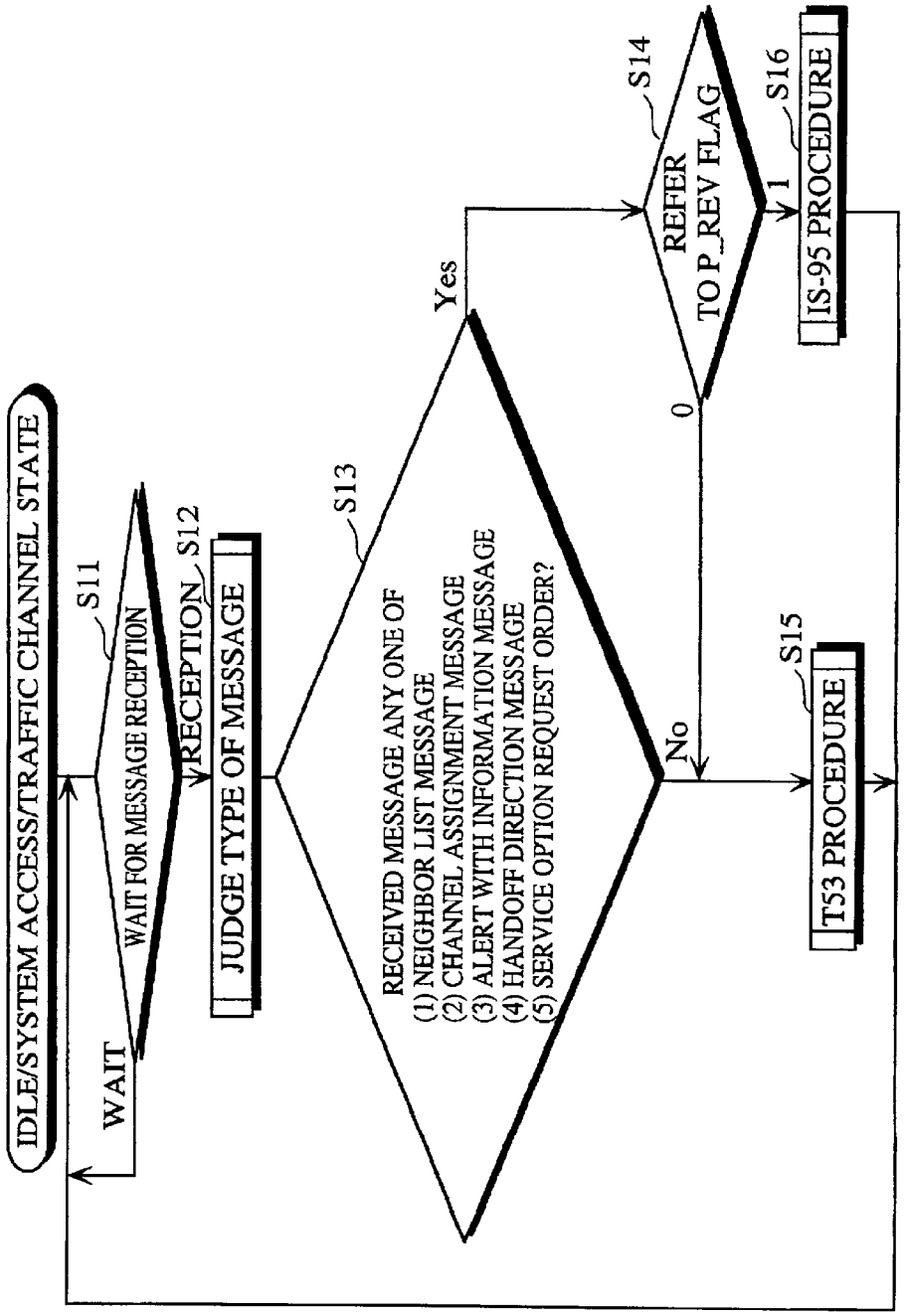
FIG. 8 is a flowchart showing the procedures of the message processing unit 3 in the idle state, the system access state, and the traffic channel state.

The sequence when the message processing unit 3 performs such procedures is shown in the flowcharts in FIG. 7 and FIG. 8. The procedures are implemented by a machine language command sequence. The message processing 3 unit has a memory apparatus that stores such machine language command sequences, and a microprocessor that executes these command sequences. The procedures performed by the message processing unit 3 will be explained below with reference to FIG. 7 and FIG. 8.

FIG. 7 is a flowchart showing the procedures performed by the message processing unit 3 in the init stage. FIG. 8 is a flowchart showing the procedures performed by the message processing unit 3 in the idle state, the system access state, and the traffic channel state. The procedures performed by the message processing unit 3 will be explained with reference to these flowcharts.

At step S1 the message processing unit 3 performs a sync channel scan on the downstream allocated frequency. At step S2 the message processing unit 3 performs sync channel acquisition. At step S3 the message processing unit 3 judges whether sync channel acquisition is successful. If acquisition is successful the message processing unit 3 proceeds to step S5. If acquisition is unsuccessful the message processing unit 3 reverses the upstream channel and downstream channel allocated frequencies at step S4 and returns to step S1. For example, if base station acquisition is unsuccessful with the frequencies allocated as in FIG. 6A, the message processing unit 3 reallocates the frequencies as in FIG. 6B, or if base station acquisition is unsuccessful with the frequencies allocated as in FIG. 6B, the message processing unit 3 reallocates the frequencies as in FIG. 6A.

If the message processing unit 3 goes through the process at steps S1 to S4 and is successful in base station acquisition, it then proceeds to step S5. At step S5 the message processing unit 3 judges whether the communication protocol used in the mobile phone system in which the portable telephone apparatus is located is IS-95 or T53. When a judgement has been made a P_REV flag is set. The P_REV flag is set as "1" when the communication protocol used in the mobile phone system in which the portable telephone apparatus is located is IS-95, and as "0" when the communication protocol is T53. At step S5, if the protocol is judged to be IS-95 the P_REV flag is set as "1" at step S7. At step S5, if the protocol is judged to be T53 the P_REV flag is set as "0" at step S6.

FIG. 8 is a flowchart showing the procedures performed by the message processing unit 3 in the idle state, the system access state, and the traffic channel state. At step S11 the message processing unit 3 waits for a reception signal. If a reception signal is received the message processing unit 3 judges the type of the message at step S12. At step S13 the message processing unit 3 judges whether the received message is an order message including any one of the messages (1) neighbor list message, (2) channel assignment message, (3) alert with information message, (4) handoff direction message, and (5) service option request order. If the judgement is negative the result of step S13 is "No" and the message processing unit 3 proceeds to step S15. At step S15 the message processing unit 3 performs procedures conforming to T53 communication protocol. However, if the received message is any of (1) to (5), the message processing unit 3 proceeds from step S13 to step S14 and refers to the P_REV flag. If the P_REV flag is set at "0" the message processing unit 3 proceeds to step S15 and performs procedures conforming to T53 communication protocol. If the P_REV flag is set at "1" the message processing unit 3 proceeds to step S16 and performs processing conforming to IS-95.

In this way, according to the present embodiment, when the communication protocol used in a mobile phone system is IS-95, the message processing unit 3 does not switch all of the plurality of procedures performed in the idle state through to the traffic channel state when a message is received, but rather it performs partial switching, switching only part of the plurality of procedures. As a result, in the portable telephone apparatus of the present embodiment the necessary amount of program code in the package is "plurality of procedures+a part of procedures", meaning that the more messages that the two communication protocols have in common, the greater the reduction in the amount of overall program code.

What is claimed is:

1. A portable telephone apparatus for roaming between a first portable telephone system and a second portable telephone system, comprising:

reception means for receiving a message transmitted from a base station in one of the first portable telephone system and the second portable telephone system;

judging means for judging whether a received message has a format which is common to each of the first and the second portable telephone systems or is unique to one of the first and the second portable telephone systems;

first processing means for storing therein program code which is common to each of the first and the second portable telephone systems, and for processing the received message by performing a procedure which is common to each of the first and the second portable telephone systems when the message has the format which is common to each of the first and the second portable telephone systems, and second processing means for storing therein program code which is unique to each of the first and the second portable telephone systems, and for processing the received message by performing a procedure which is unique to one of the first and the second portable telephone systems when the message has the format which is unique to one of the first and the second portable telephone systems.

2. A portable telephone apparatus according to claim 1, the portable telephone apparatus further comprising:

protocol revision receiving means or receiving, from the base station, a protocol revision message showing a type of communication protocol used in one of the two systems;

wherein the reception means receive a succeeding message which succeeds the protocol revision message, from the base station;

the second processing means processes the succeeding message by performing a procedure unique to the first system when the communication protocol in the first system is shown in the protocol revision message, and processes the following message by performing a procedure unique to the second system when the communication protocol in the second system is shown in the protocol revision message.

3. A portable telephone apparatus according to claim 2, wherein a base station in the first system transmits the protocol revision message on a first frequency, and a base station in the second system transmits the protocol revision message on a second frequency, wherein the protocol receiving means receives either of the two protocol revision messages by scanning the first frequency and the second frequency.

4. A portable telephone apparatus according to claim 1, wherein the first system is an IS-95 ode Division Multiple Access (CDMA) mobile telephone system, the second system is an ARIB STD-T53 CDMA mobile telephone system, and the message having a different format is one of a) a neighbor list message showing a list of a plurality of base stations located close to the portable telephone apparatus, b) a channel assignment message notifying channel allocation, c) a message including a service option request order for deciding a communication mode, d) a handoff direction message for handoff processing, and e) a message for performing ringer control.

5. A portable telephone apparatus according to claim 4, the portable telephone apparatus further comprising:

protocol revision receiving means for receiving, from the base station, a protocol revision message showing a type of communication protocol used in one of the two systems;

wherein the reception means receives a succeeding message which succeeds the protocol revision message, from the base station;

the second processing means processes the succeeding message by performing a procedure unique to the first system when the communication protocol in the first system is shown in the protocol revision message, and processes the following message by performing a procedure unique to the second system when the communication protocol in the second system is shown in the protocol revision message.

6. A portable telephone apparatus configured to roam between a first portable telephone system and a second portable telephone system, wherein the first portable telephone system is configured to communicate using a first communication protocol, and the second portable telephone system is configured to communicate using a second communication protocol, wherein the portable telephone apparatus comprises:

a reception unit which receives a message from one of a first base station of the first portable telephone system and a second base station of the second portable telephone system;

a judging unit coupled to the reception unit, wherein the judging unit determines whether a format of the message corresponds to a program code which is common to each of the first and the second communication protocols, or whether the format of the message corresponds to a program code which is unique to one of the first and the second communication protocols;

a first processing arrangement coupled to the reception unit, wherein the first processing arrangement has stored therein the program code which is common to each of the first and the second communication protocols, and the first processing arrangement processes the message when the format of the message corresponds to the program code which is common to each of the first and the second communication protocols; and a second processing arrangement coupled to the reception unit, wherein the second processing arrangement has stored therein the program code which is unique to the first communication protocol and the program code which is unique to the second communication protocol, wherein the second processing arrangement processes the message when the format of the message corresponds to the program code which is unique to one of the first and the second communication protocols.

7. A communication system, comprising:

a first portable telephone system configured to communicate using a first communication protocol, wherein the first portable telephone system comprises a first base station;

a second portable telephone system configured to communicate using a second communication protocol, wherein the second portable telephone system comprises a second base station; and a portable telephone apparatus configured to roam between the first portable telephone system and the second portable telephone system, comprising:

a reception unit which receives a message from one of the first base station and the second base station;

a judging unit coupled to the reception unit, wherein the judging unit determines whether a format of the message corresponds to a program code which is common to each of the first and the second communication protocols, or whether the format of the message corresponds to a program code which is unique to one of the first and the second communication protocols;

a first processing arrangement coupled to the reception unit, wherein the first processing arrangement has stored therein the program code which is common to each of the first and the second communication protocols, and the first processing arrangement processes the message when the format of the message corresponds to the program code which is common to each of the first and the second communication protocols; and a second processing arrangement coupled to the reception unit, wherein the second processing arrangement has stored therein the program code which is unique to the first communication protocol and the program code which is unique to the second communication protocol, wherein the second processing arrangement processes the message when the format of the message corresponds to the program code which is unique to one of the first and the second communication protocols.

* * * * *